United States Patent
Hwang et al.

(10) Patent No.: US 12,473,534 B2
(45) Date of Patent: Nov. 18, 2025

(54) COMPOSITION FOR CULTURING PERIPHERAL BLOOD MONOCYTE-DERIVED REGULATORY T CELL AND REGULATORY T CELL CULTURING METHOD USING SAME

(71) Applicant: Immunisbio Co., Ltd., Seo-gu Incheon (KR)

(72) Inventors: Sung Hwan Hwang, Gangseo-gu Seoul (KR); Jung Hwa Kang, Gangnam-gu Seoul (KR)

(73) Assignee: IMMUNISBIO CO., LTD., Seo-gu Incheon (KR)

( * ) Notice: Subject to any disclaimer, the term of this patent is extended or adjusted under 35 U.S.C. 154(b) by 839 days.

(21) Appl. No.: 17/762,836

(22) PCT Filed: Apr. 7, 2020

(86) PCT No.: PCT/KR2020/004663
§ 371 (c)(1),
(2) Date: Mar. 23, 2022

(87) PCT Pub. No.: WO2021/060638
PCT Pub. Date: Apr. 1, 2021

(65) Prior Publication Data
US 2022/0333076 A1 Oct. 20, 2022

(30) Foreign Application Priority Data
Sep. 24, 2019 (KR) .................. 10-2019-0117471

(51) Int. Cl.
| C12N 5/0783 | (2010.01) |
| A61K 40/11 | (2025.01) |
| A61K 40/22 | (2025.01) |
| A61K 40/41 | (2025.01) |
| A61P 37/00 | (2006.01) |

(52) U.S. Cl.
CPC ............ C12N 5/0637 (2013.01); A61K 40/11 (2025.01); A61K 40/22 (2025.01); A61K 40/416 (2025.01); A61P 37/00 (2018.01); C12N 2501/15 (2013.01); C12N 2501/2302 (2013.01); C12N 2501/2304 (2013.01); C12N 2501/2307 (2013.01); C12N 2501/2312 (2013.01); C12N 2501/2315 (2013.01); C12N 2501/2334 (2013.01); C12N 2501/51 (2013.01); C12N 2501/515 (2013.01); C12N 2501/52 (2013.01); C12N 2501/53 (2013.01); C12N 2501/599 (2013.01); C12N 2501/71 (2013.01)

(58) Field of Classification Search
None
See application file for complete search history.

(56) References Cited

U.S. PATENT DOCUMENTS

2003/0228635 A1* 12/2003 Hu .................. G01N 33/5005
424/178.1
2006/0292164 A1 12/2006 Horwitz

FOREIGN PATENT DOCUMENTS

| JP | 2008-534620 A | 8/2008 |
| KR | 10-2015-0126311 A | 11/2015 |
| KR | 10-2018-0027533 A | 3/2018 |
| KR | 10-2018-0092951 A | 8/2018 |
| WO | 2009/155477 A1 | 12/2009 |

OTHER PUBLICATIONS

Wang, 2012, J. Agr. Food Chem. vol. 60: 2171-2178.*
Ebinuma, 2008, J. Vir. vol. 82: 5043-5053.*
Int'l Search Report and Written Opinion issued Jul. 22, 2020 in Int'l Application No. PCT/KR2020/004663, English translation of Int'l Search Report only.

* cited by examiner

*Primary Examiner* — Amy E Juedes
(74) *Attorney, Agent, or Firm* — Panitch Schwarze Belsiario & Nadel LLP

(57) ABSTRACT

A composition for culturing peripheral blood monocyte-derived regulatory T cells includes at least one antibody selected from the group consisting of anti-CD2, anti-CD3, anti-CD7, anti-CD8, anti-CD28, anti-CD30L, anti-CD40, anti-CD70, anti-CD80, anti-CD83, and anti-CD86; at least one cytokine selected from the group consisting of interleukin-2, interleukin-4, interleukin-7, interleukin-12, interleukin-15, interleukin-34, and TGF-β; and superoxide dismutase. A regulatory T cell culturing method using this composition is also provided. The regulatory T cells accordingly obtained by this method can be utilized for treatment of autoimmune diseases.

2 Claims, 3 Drawing Sheets

COMPOSITION FOR CULTURING PERIPHERAL BLOOD MONOCYTE-DERIVED REGULATORY T CELL AND REGULATORY T CELL CULTURING METHOD USING SAME

CROSS-REFERENCE TO RELATED APPLICATIONS

This application is a Section 371 of International Application No. PCT/KR2020/004663, filed Apr. 7, 2020, which was published in the Korean language on Apr. 1, 2021, under International Publication No. WO 2021/060638 A1, which claims priority under 35 U.S.C. § 119 (b) to Korean Application No. 10-2019-0117471, filed Sep. 24, 2019, the disclosure of each of which is incorporated herein by reference in its entirety.

BACKGROUND

1. Field of the Invention

The present invention relates to a composition for culturing regulatory T cells derived from peripheral blood mononuclear cells, including an antibody, a cytokine and superoxide dismutase, and a culturing method using the same.

2. Discussion of Related Art

An autoimmune disease is a disorder in which endogenous tissue is recognized as foreign materials or abnormal cells due to incorrect information of the immune system to cause serious inflammatory responses and form autoantibodies, and as a result, interrupts the function of attacked internal organs over time, and is most commonly a disease in which the immune system is weakened and the body is sensitively exposed to all types of diseases. Examples of autoimmune diseases that are known to date include multiple sclerosis, Guillain-Barre syndrome, autism, peripheral neuropathy, diabetic peripheral neuritis, leukemia, lupus erythematosus, hemolytic hypoglycemia, rheumatoid arthritis, ankylosing spondylitis, polymyalgia, celiac disease, Crohn's disease, ulcerative colitis, type 1 diabetes, psoriasis, vitiligo, eczema, scleroderma, muscular atrophy, fibromyalgia, thyroiditis, Hashimoto's disease, Graves' disease, Wegener's granulomatosis, primary biliary cirrhosis, autoimmune hepatitis, adrenocortical insufficiency, Sjogren's syndrome, and the like.

Regulatory T cells (Tregs), which are cells involved in autoimmune diseases, have the function of suppressing the activation of the immune system as a group of T cells, thereby preventing the onset of autoimmune diseases in a healthy organism by controlling the self-tolerance of the immune system. It is known that regulatory T cells have a marker CD25 known as an IL-2 specific receptor, and thus absorb IL-2 that is a cytokine required for effector T lymphocytes and exert a strong suppressive function by secreting IL-10, transforming growth factor-β (TGF-β), IL-35, and the like. In particular, IL-10, initially known as a cytokine synthesis inhibitory factor (CSIF), was originally described as an IFN-γ synthesis inhibitor, and is known as a major regulator of a humoral immune response. Further, since IL-10 suppresses the production of proinflammatory cytokines, suppresses the antigen-presenting function of antigen-presenting cells such as monocytes, macrophages or dendritic cells, and is expressed and secreted as a potent immunomodulator of hematopoietic cells, particularly, immune cells, in almost all immune cells to act on most of the immune cells, thereby regulating immune responses, many attempts have been made to apply IL-10 to the treatment of autoimmune diseases.

Meanwhile, superoxide dismutase (SOD) is an enzyme that is present in almost all living organisms, and removes the superoxide anion radical ($\cdot O_2^-$) generated by a reaction of oxygen molecules and electrons ($2O_2 + 2e^- \rightarrow 2 \cdot O_2^-$). Since hydrogen peroxide produced by the action of the superoxide anion radical and the SOD produces the hydroxyl radical ($\cdot OH$), which is the most toxic active oxygen species, in vivo hydrogen peroxide is converted into non-toxic water ($H_2O$) by a peroxidase or catalase, and the like. In this case, SOD plays an important role in autoimmunity because SOD acts to remove superoxide anion radicals and also to prevent the generation of hydroxyl group radicals. However, no culturing method for inducing the differentiation of regulatory T cells associated with autoimmunity by adding SOD has been reported.

Thus, the present invention is intended to provide a method for culturing regulatory T cells applicable to the treatment of autoimmune diseases.

SUMMARY OF THE INVENTION

Thus, the present inventors confirmed the effect of inducing the differentiation of regulatory T cells according to the concentrations of an antibody, a cytokine and superoxide dismutase, thereby the present invention was established therefrom.

Therefore, an object of the present invention is to provide a composition for culturing regulatory T cells derived from peripheral blood mononuclear cells, including one or more antibodies selected from the group consisting of anti-CD2, anti-CD3, anti-CD7, anti-CD8, anti-CD28, anti-CD30L, anti-CD40, anti-CD70, anti-CD80, anti-CD83 and anti-CD86; one or more cytokines selected from the group consisting of interleukin-2, interleukin-4, interleukin-7, interleukin-12, interleukin-15, interleukin-34 and TGF-β; and superoxide dismutase.

Another object of the present invention is to provide a method for culturing regulatory T cells derived from peripheral blood mononuclear cells, the method including: culturing the isolated peripheral blood mononuclear cells in a culture composition, wherein the culture composition comprises one or more antibodies selected from the group consisting of anti-CD2, anti-CD3, anti-CD7, anti-CD8, anti-CD28, anti-CD30L, anti-CD40, anti-CD70, anti-CD80, anti-CD83 and anti-CD86; one or more cytokines selected from the group consisting of interleukin-2, interleukin-4, interleukin-7, interleukin-12, interleukin-15, interleukin-34 and TGF-β; and superoxide dismutase.

Still another object of the present invention is to provide a kit for culturing regulatory T cells derived from peripheral blood mononuclear cells, including one or more antibodies selected from the group consisting of anti-CD2, anti-CD3, anti-CD7, anti-CD8, anti-CD28, anti-CD30L, anti-CD40, anti-CD70, anti-CD80, anti-CD83 and anti-CD86; one or more cytokines selected from the group consisting of interleukin-2, interleukin-4, interleukin-7, interleukin-12, interleukin-15, interleukin-34 and TGF-β; and superoxide dismutase.

Yet another object of the present invention is to provide a pharmaceutical composition for use in treatment of an autoimmune disease, including the regulatory T cells obtained according to the present invention as an active ingredient.

Yet another object of the present invention is to provide a method for treating an autoimmune disease, the method including: administering a pharmaceutical composition including the regulatory T cells obtained according to the present invention as an active ingredient to a subject in need thereof.

To achieve the objects, the present invention provides a composition for culturing regulatory T cells derived from peripheral blood mononuclear cells, including one or more antibodies selected from the group consisting of anti-CD2, anti-CD3, anti-CD7, anti-CD8, anti-CD28, anti-CD30L, anti-CD40, anti-CD70, anti-CD80, anti-CD83 and anti-CD86; one or more cytokines selected from the group consisting of interleukin-2, interleukin-4, interleukin-7, interleukin-12, interleukin-15, interleukin-34 and TGF-β; and superoxide dismutase.

As used herein, regulatory T cells refer to cells capable of regulating T cell responses using CD4+CD25+CD127− as a marker. Since the regulatory T cells have a characteristic of controlling an inflammatory response by suppressing the function of abnormally activated immune cells, the regulatory T cells can exhibit a treatment effect on autoimmune diseases by suppressing autoimmunity.

In addition, it was confirmed by the examples of the present invention that the differentiation of regulatory T cells was induced even though a flavonoid was further added to the culture composition (Examples 1 and 2).

Therefore, the present invention provides a composition or method for culturing regulatory T cells derived from peripheral blood mononuclear cells, wherein the composition is the above culture composition to which flavonoids are added.

In the present invention, the flavonoid is a material representing a plant pigment, and may include flavanone-based hesperetin, naringenin, and eriodictyol, or flavanol-based catechin, epicatechin, epigallocatechin, gallate, epigallocatechin gallate, theaflavin, thearubigin, and proanthocyanidin, or flavonol-based quercetin, kaempferol, myricetin, and isorhamnetin, or isoflavone-based daidzein, genistein or glycitein, and the like, but is not limited thereto.

A peripheral blood mononuclear cell (PBMC) is a peripheral blood cell with a round nucleus. Peripheral blood mononuclear cells are frequently used in the field of immune research, including autoimmune disorders. As used herein, the peripheral blood mononuclear cells refer to mononuclear cells isolated from peripheral blood commonly used for immunotherapy.

In the example of the present invention, peripheral blood mononuclear cells are cultured in 5 to 100 mL of KBM502 medium including 0.1 to 100 ng/mL of one or more antibodies selected from the group consisting of anti-CD2, anti-CD3, anti-CD7, anti-CD8, anti-CD28, anti-CD30L, anti-CD40, anti-CD70, anti-CD80, anti-CD83 and anti-CD86; 10 to 2,000 ng/mL of one or more cytokines selected from the group consisting of interleukin-2, interleukin-4, interleukin-7, interleukin-12, interleukin-15, interleukin-34 and TGF-β; and 0 to 50 μM of superoxide dismutase (Example 1).

Therefore, the present invention provides a method for culturing regulatory T cells derived from peripheral blood mononuclear cells, the method including: culturing the isolated peripheral blood mononuclear cells in a culture composition, wherein the culture composition comprises one or more antibodies selected from the group consisting of anti-CD2, anti-CD3, anti-CD7, anti-CD8, anti-CD28, anti-CD30L, anti-CD40, anti-CD70, anti-CD80, anti-CD83 and anti-CD86; one or more cytokines selected from the group consisting of interleukin-2, interleukin-4, interleukin-7, interleukin-12, interleukin-15, interleukin-34 and TGF-β; and superoxide dismutase.

As used herein, the term "culture" refers to growing an organism or a part (organs, tissues, cells, and the like) of the organism under appropriate artificially adjusted environmental conditions.

Furthermore, as used herein, the term "medium" refers to a nutrient source in a liquid or gel state, devised to proliferate microorganisms or cells, small plants such as moss, and the like. As a medium, different types of media are used depending on the types of cells to be cultured.

In the present invention, the medium may be used for cell culture, and the medium may be a medium including one or more selected from the group consisting of Dulbecco's Modified Eagle's Medium (DMEM), Minimal Essential Medium (MEM), Basal Medium Eagle (BME), RPMI, Minimal Essential Medium-α (MEM-α), Glasgow's Minimal Essential Medium (G-MEM), Iscove's Modified Dulbecco's Medium (IMDM), MacCoy's 5A medium, AmnioMax complete medium, AminoMax II complete medium, Endothelial Basal Medium (EBM) medium, Chang's medium, KBM, i-Medium and X-Vivo medium, but is not limited thereto.

The present invention also provides a kit for culturing regulatory T cells derived from peripheral blood mononuclear cells, including one or more antibodies selected from the group consisting of anti-CD2, anti-CD3, anti-CD7, anti-CD8, anti-CD28, anti-CD30L, anti-CD40, anti-CD70, anti-CD80, anti-CD83 and anti-CD86; one or more cytokines selected from the group consisting of interleukin-2, interleukin-4, interleukin-7, interleukin-12, interleukin-15, interleukin-34 and TGF-β; and superoxide dismutase.

The kit may further include a container containing a buffer for injection. The container used in the kit may be a sealable glass or plastic container that contains, for example, the pharmaceutical composition of the present invention. The container may be sufficient as long as the container contains the pharmaceutical composition of the present invention, but does not require a particular form.

The present invention also provides a pharmaceutical composition for use in treatment of an autoimmune disease, including the regulatory T cells obtained according to the present invention as an active ingredient.

The autoimmune disease may be selected from multiple sclerosis, Guillain-Barre syndrome, autism, peripheral neuropathy, diabetic peripheral neuritis, leukemia, lupus erythematosus, hemolytic hypoglycemia, rheumatoid arthritis, ankylosing spondylitis, polymyalgia, celiac disease, Crohn's disease, ulcerative colitis, type 1 diabetes, psoriasis, vitiligo, eczema, scleroderma, muscular atrophy, fibromyalgia, thyroiditis, Hashimoto's disease, Graves' disease, Wegener's granulomatosis, primary biliary cirrhosis, autoimmune hepatitis, adrenocortical insufficiency, and Sjogren's syndrome, but is not limited thereto.

According to the present invention, regulatory T cells may be usefully used for the prevention and treatment of an autoimmune disease.

In the present invention, a subject may be a human in need of the prevention and/or treatment of an autoimmune disease. The subject also includes a patient or a normal person.

Thus, the present invention provides a method for treating an autoimmune disease, the method including: administering a pharmaceutical composition including regulatory T cells as an active ingredient to a subject in need thereof.

As used herein, the term "active ingredient" refers to an ingredient that exerts the effect of a drug or quasi-drug, and in the present invention, refers to an ingredient that exerts an active effect of treating an autoimmune disease.

As used herein, the term "treatment" refers to all actions in which the symptoms of an autoimmune disease are ameliorated or completely cured by administration of a composition containing the regulatory T cells of the present invention.

As used herein, the term "pharmaceutical composition" refers to a medicine in which cells cultured in vitro for the purpose of treating a disease or the like are administered to the human body.

As a route of administration of the pharmaceutical composition, the pharmaceutical composition may be administered via various oral or parenteral routes as long as the pharmaceutical composition can reach a target tissue. The pharmaceutical composition may be administered via a parenteral route, for example, intraperitoneally, intravenously, intramuscularly, subcutaneously, intradermally, topically, intranasally, intrapulmonarily, and rectally, but the parenteral route is not limited thereto.

Further, the pharmaceutical composition may be formulated in a suitable form together with a pharmaceutical carrier generally used for the pharmaceutical composition. In addition, the pharmaceutical composition refers to a composition that is physiologically acceptable and does not usually cause an allergic reaction such as a gastrointestinal disorder or vertigo or a reaction similar thereto when administered to a human. An acceptable carrier for a pharmaceutical composition includes, for example, a carrier for parenteral administration, such as water, a suitable oil, a saline solution, aqueous glucose and glycol, and may further include a stabilizer and a preservative. Examples of a suitable stabilizer include an antioxidant such as sodium hydrogen sulfite, sodium sulfite or ascorbic acid. Examples of a suitable preservative include benzalkonium chloride, methyl- or propyl-paraben and chlorobutanol. As other pharmaceutically acceptable carriers, those described in the following literature may be referenced (Remington's Pharmaceutical Sciences, 19$^{th}$ ed., Mack Publishing Company, Easton, PA, 1995).

Terms not defined herein have meanings typically used in the art to which the present invention pertains.

The benefits and features of the present invention, and the methods of achieving the benefits and features will become apparent with reference to embodiments to be described below in detail. However, the present invention is not limited to the embodiments to be disclosed below, but may be implemented in various other forms, and the present embodiments are only provided for rendering the disclosure of the present invention complete and for fully representing the scope of the invention to a person with ordinary skill in the technical field to which the present invention pertains, and the present invention will be defined only by the scope of the claims.

Since the composition for culturing regulatory T cells according to the present invention induces the differentiation of regulatory T cells, the composition can be widely used for culturing regulatory T cells derived from peripheral blood mononuclear cells.

DETAILED DESCRIPTION OF EXEMPLARY EMBODIMENTS

Figure 1:
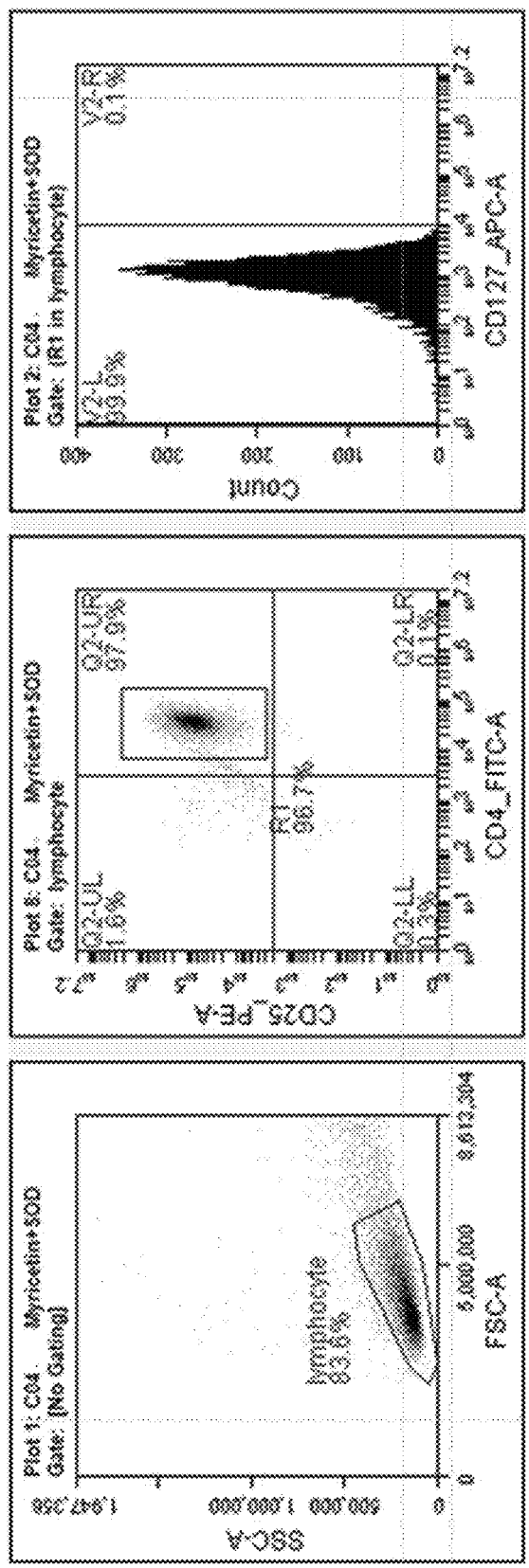
FIG. 1 is a set of graphs showing the results of measuring the number of lymphocyte cells which can be obtained by culturing according to the present invention by flow cytometry.

Hereinafter, the present invention will be described in detail through the Examples. However, the following Examples are only for exemplifying the present invention, and the scope of the present invention is not limited to the following Examples.

EXAMPLES

Experimental Example 1: Preparation of Regulatory T Cells from Peripheral Blood Mononuclear Cells 30 mL to 60 mL of human peripheral blood was collected using a 10 mL heparinized vacuum blood collection tube (BD Vacutainer TM). Then, 15 mL of a solution of Ficoll-Paque Plus (endotoxin tested, density 1.077 g/mL, GE Healthcare, USA) was put into a 50 mL lymphocyte separation tube (Leucosep, Greiner Bio-One, Swiss), and the solution was allowed to precipitate down to a glass membrane in the tube by centrifugation at 2000 rpm. The collected blood was transferred to a separation tube and centrifuged at 2500 rpm to separate the erythrocytes and granulocyte layer at the bottom, and the mononuclear cell layer and platelets at the top, thereby separating the blood components.

After centrifugation, the plasma in the separated upper layer was inactivated in a water bath at 56° C. for 30 minutes. After centrifugation, the separated lymphocyte layer was collected using a sterilized pipette and collected in a 15 mL tube. After the 15 mL tube with the collected lymphocytes were centrifuged, the supernatant was removed. Cells were washed by adding 10 mL of a buffer solution (PBS) to the lymphocytes from which the supernatant had been removed and suspending the cells. The number of cells was measured from some of the suspension using a hemocytometer, and only lymphocytes were collected by centrifuging again. In this case, the number of harvested lymphocytes was measured to be 20×10$^6$ cells in total, and the harvested lymphocytes were cultured according to Example 1 below.

Example 1: Culturing of Regulatory T Cells According to Treatment Concentrations of Myricetin and Superoxide Dismutase After the lymphocytes prepared in Experimental Example 1 were taken, the lymphocytes were cultured in a T-flask (SPL Life Sciences) containing a culture solution and 0.2 to 2 mL of plasma in a 5% CO$_2$ incubator at 37° C. for 4 to 14 days. Furthermore, in order to induce a reaction with an activation receptor present on the cell surface of regulatory T cells, 0.001 to 0.03 of one or more antibodies selected from the group consisting of anti-CD2, anti-CD3, anti-CD7, anti-CD8, anti-CD28, anti-CD30L, anti-CD40, anti-CD70, anti-CD80, anti-CD83 and anti-CD86; one or more cytokines selected from the group consisting of interleukin-2, interleukin-4, interleukin-7, interleukin-12, interleukin-15, interleukin-34 and TGF-β; 0 to 250 μM of myricetin; and 0 to 50 μM of superoxide dismutase were administered. That is, lymphocytes measured to be a total number of $2.0 \times 10^7$ cells were added to 5 to 100 mL of KBM502 medium including the above-described plasma, antibodies, cytokines, myricetin and superoxide dismutase, and cultured in a $CO_2$ incubator for 4 to 14 days. The culture results are shown in the following Table 1.

Example 2: Results of Culturing Regulatory T Cells According to Addition of Myricetin and Superoxide Dismutase Only or in Combination after Removal of CD8

After peripheral blood mononuclear cells were separated, the cells were suspended in MACS buffer from Miltenyi Biotec and reacted with Human CD8 MicroBeads, and then CD8+ cells were removed using an LD column in a QuadroMACS Separator. Then, the cells were cultured using the same culturing method as in Example 1, and treated with myricetin and superoxide dismutase by selecting the treatment concentration having the highest regulatory T cell distribution in Example 1. The culture results are shown in the following Table 2.

Experimental Example 2: FACS Analysis

To confirm the differentiation of regulatory T cells, staining was performed with an anti-human antibody or mouse isotype antibody (BD-Pharmingen San Jose, USA) under a condition of CD4+, CD25+ and CD127−, which are surface proteins of regulatory T cells, measured by flow cytometry, and then analyzed using BD Accuri C6 Plus.
1) Results of Culturing Regulatory T Cells According to Treatment Concentrations of Myricetin and Superoxide Dismutase

TABLE 1

| Treated group | | CD4+, CD25+, CD127− (%) | | Total number of cells($\times 10^7$ cells) |
|---|---|---|---|---|
| | | Day 0 | Day 7 | Day 7 |
| Example 1-1 | M1 | 2.1 | 22.4 | 26.8 |
| (Myricetin only) | M2 | 2.1 | 22.9 | 26.7 |
| | M3 | 2.1 | 24.7 | 28.6 |
| | M4 | 2.1 | 23.3 | 25.6 |
| Example 1-2 | S1 | 1.2 | 37.4 | 22.5 |
| (SOD only) | S2 | 1.2 | 37.1 | 25.2 |
| | S3 | 1.2 | 36.0 | 24.4 |
| control | | 1.2 | 18.0 | 20.8 |

2) Results of Culturing Regulatory T Cells According to Addition of Myricetin and Superoxide Dismutase Only or in Combination after Removal of CD8

TABLE 2

| Treated group | | CD4+, CD25+, CD127− (%) | | Total number of cells($\times 10^7$ cells) |
|---|---|---|---|---|
| | | Day 0 | Day 7 | Day 7 |
| Example 2 | M3 | 0.4 | 97.6 | 20.8 |
| (only or in | S1 | 0.7 | 97.6 | 21.5 |
| combination after | M3 + | 0.7 | 97.8 | 21.6 |
| removal of CD8) | S1 | | | |
| control | | 0.7 | 92.3 | 18.2 |

According to the present invention, it was confirmed that a minimum of 160 million to a maximum of 250 million CD4+, CD25+, and CD127− regulatory T cells could be obtained by short-term culture for 4 to 14 days (FIG. 1).

Experimental Example 3: Cytokine Array

By focusing on the fact that regulatory T cells have the effect of suppressing autoimmune diseases and autoimmune inflammation, an amount of produced anti-inflammatory cytokines was measured.

Figure 2:
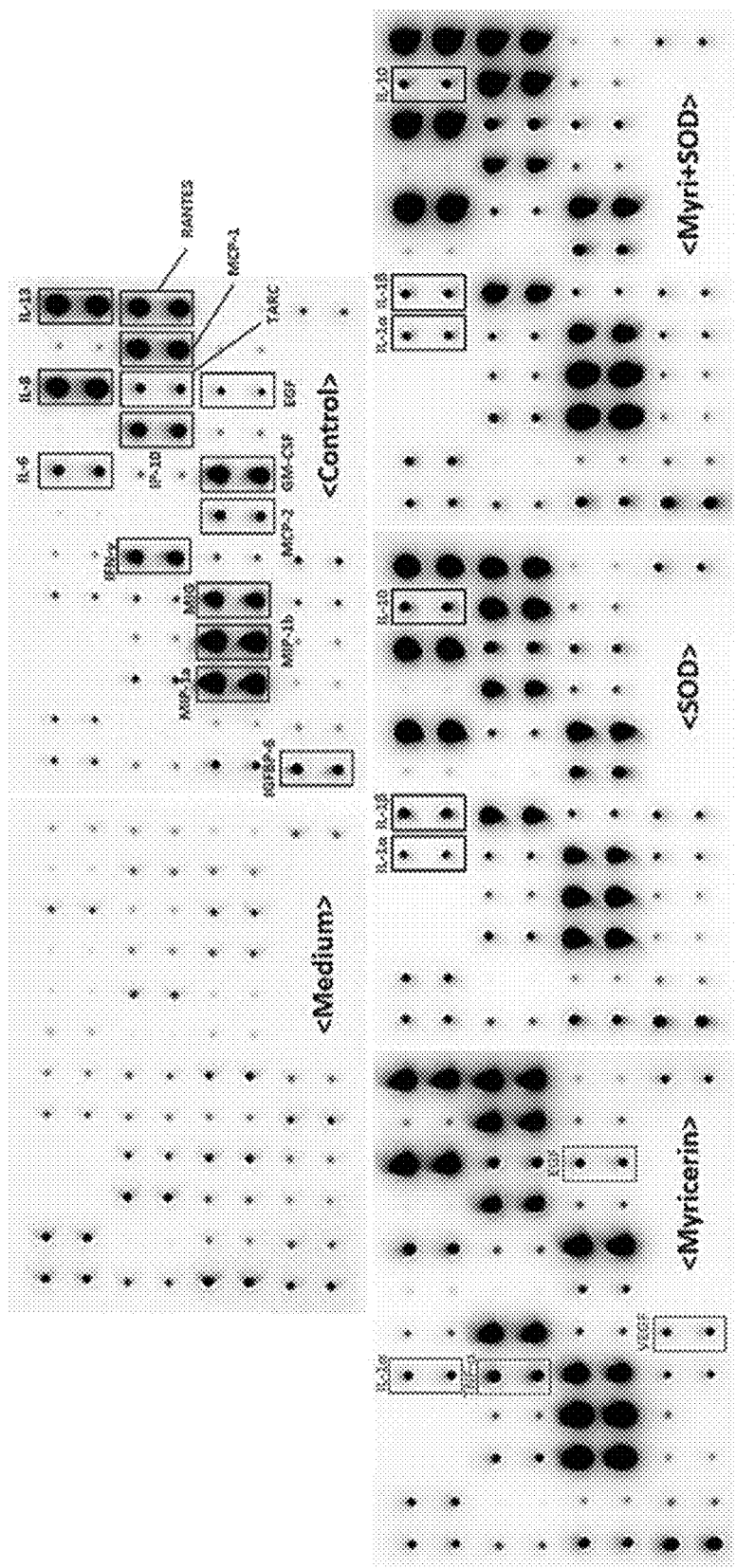
FIG. 2 is a set of images illustrating the production amounts of cytokines which the regulatory T cells of the present invention secrete.

As a result of flow cytometry analysis, a quantitative analysis was performed using human cytokine arrays manufactured by RayBiotech Inc. in order to analyze cytokines contained in the culture solution in Example 2 in which the highest T cell distribution was measured. The culture solution to be measured and the kit stored frozen reached the same temperature as room temperature by being allowed to stand at normal temperature. A cytokine array membrane was put into a well such that the "-" marked portion thereof was located in the upper left part. 2 mL of a blocking buffer was put into each well, and the well was shaken at room temperature for 30 minutes. The blocking buffer was removed, 1 mL of a culture solution sample was put into each well, and a shaking treatment was performed at 4° C. overnight. After the treatment, the sample was washed three times and twice with wash buffer I and wash buffer II, respectively, at normal temperature using a rocking shaker, and then 1 mL of a biotin conjugated antibody cocktail was added thereto, and a shaking treatment was performed at 4° C. overnight. After the treatment, the sample was washed with wash buffers I and II at normal temperature using a rocking shaker, 2 mL of HRP-Streptavidin was added thereto, and the resulting mixture was allowed to react overnight. After the reaction, the sample was washed with wash buffers I and II, the wash solution was removed by taking out the cytokine array membrane, the cytokine array membrane was placed on a plastic film, a reaction solution in which detection buffers C and D were mixed was dropped onto the top of the membrane, and then images were read using the Davinch-Western™ Imaging System (FIG. 2).

Experimental Example 4: Interleukin-10 (IL-10) ELISA Test

In the present invention, in order to measure the production amount of interleukin-10 secreted by regulatory T cells, a qualitative and quantitative analysis was performed using a sandwich ELISA kit manufactured by R&D Systems. Human interleukin-10 standard was serially diluted ½ in a 96-well plate and used, and cells were removed by centrifuging the cell culture solution at 400 G for 10 minutes, put into a 96-well plate, covered with an adhesive strip, and allowed to react at normal temperature for 2 hours. After the reaction, the cells were washed twice using a wash buffer, the wash buffer was perfectly removed by completely turning the plate over, 200 μl each of an interleukin-10 conjugate was added thereto, and the resulting mixture was allowed to react at normal temperature for 1 hour. After the reaction, washing was performed, a substrate solution was added to each well, the resulting mixture was allowed to react for 20 minutes under dark conditions where light was blocked, the reaction was stopped by adding a stop solution thereto, and absorbance was measured at a wavelength of 450 nm.

Figure 3:
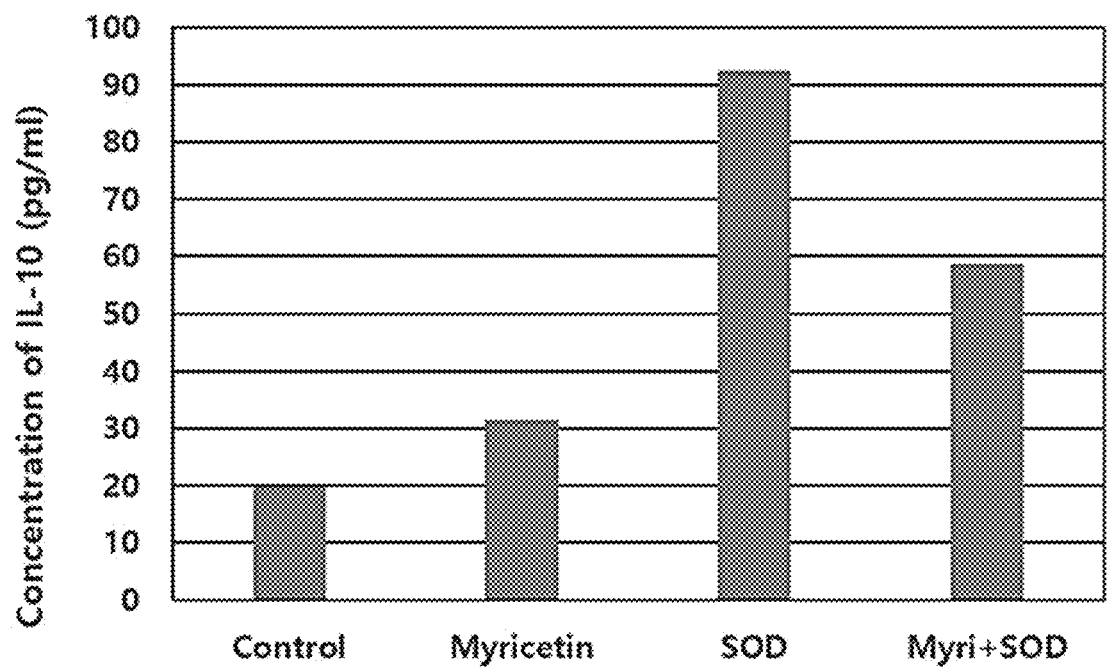
FIG. 3 is a graph showing values obtained by performing an ELISA test and calculating measured absorbance values using standard average measured values in order to measure a production amount of interleukin-10 secreted by the regulatory T cells of the present invention.

The measured absorbance value was calculated using the standard average measured value (FIG. 3).

What is claimed is:

1. A composition for inducing the differentiation of regulatory T cells from peripheral blood mononuclear cells, comprising a combination of anti-CD28 antibody, interleukin-2, superoxide dismutase, and myricetin, as a differentiation inducer.

2. A kit for inducing the differentiation of regulatory T cells from peripheral blood mononuclear cells, comprising a combination of anti-CD28 antibody, interleukin-2, superoxide dismutase, and myricetin, as a differentiation inducer.

* * * * *